US012442232B2

(12) United States Patent
Isler

(10) Patent No.: US 12,442,232 B2
(45) Date of Patent: Oct. 14, 2025

(54) FURNITURE FITTING AND ITEM OF FURNITURE HAVING SUCH A FURNITURE FITTING

(71) Applicant: Julius Blum GmbH, Hoechst (AT)

(72) Inventor: Kadir Isler, Altach (AT)

(73) Assignee: JULIUS BLUM GMBH, Hoechst (AT)

( * ) Notice: Subject to any disclaimer, the term of this patent is extended or adjusted under 35 U.S.C. 154(b) by 165 days.

(21) Appl. No.: 18/210,876

(22) Filed: Jun. 16, 2023

(65) Prior Publication Data

US 2023/0332446 A1 Oct. 19, 2023

Related U.S. Application Data

(63) Continuation of application No. PCT/AT2021/060473, filed on Dec. 14, 2021.

(30) Foreign Application Priority Data

Dec. 17, 2020 (AT) .......................... GM 50268/2020

(51) Int. Cl.
*E05D 5/06* (2006.01)
*E05D 11/10* (2006.01)

(52) U.S. Cl.
CPC .......... *E05D 5/065* (2013.01); *E05D 11/1007* (2013.01); *E05Y 2900/20* (2013.01)

(58) Field of Classification Search
CPC .. E05D 5/065; E05D 11/1007; E05Y 2900/20
See application file for complete search history.

(56) References Cited

U.S. PATENT DOCUMENTS 1,766,183 A 6/1930 Mealia
1,888,829 A 11/1932 Moore
5,131,449 A * 7/1992 Winn .................... E06B 3/5045 160/214

(Continued)

FOREIGN PATENT DOCUMENTS

AT 16935 12/2020
CN 104080992 10/2014

(Continued)

OTHER PUBLICATIONS

International Search Report issued Mar. 28, 2022 in International (PCT) Application No. PCT/AT2021/060473.

*Primary Examiner* — Daniel J Rohrhoff
(74) *Attorney, Agent, or Firm* — Wenderoth, Lind & Ponack, L.L.P.

(57) ABSTRACT

A furniture fitting includes a first fitting part, preferably in the form of a hinge cup, which can be fastened on and/or in a wall, and a second fitting part which can be attached to a door leaf. In the closed position of a door leaf, the two fitting parts can be connected to one another, and in the open position of the door leaf they can be separated from one another. The two fitting parts each have a support element, and the support elements of the two fitting parts can be brought into abutment against one another by a movement, preferably a pivoting movement, of the door leaf into the closed position in such a way that in the closed position of the door leaf, the two fitting parts can be supported against one another at least in a transverse direction with respect to the door leaf.

15 Claims, 8 Drawing Sheets

(56) References Cited

U.S. PATENT DOCUMENTS

Figure 1:
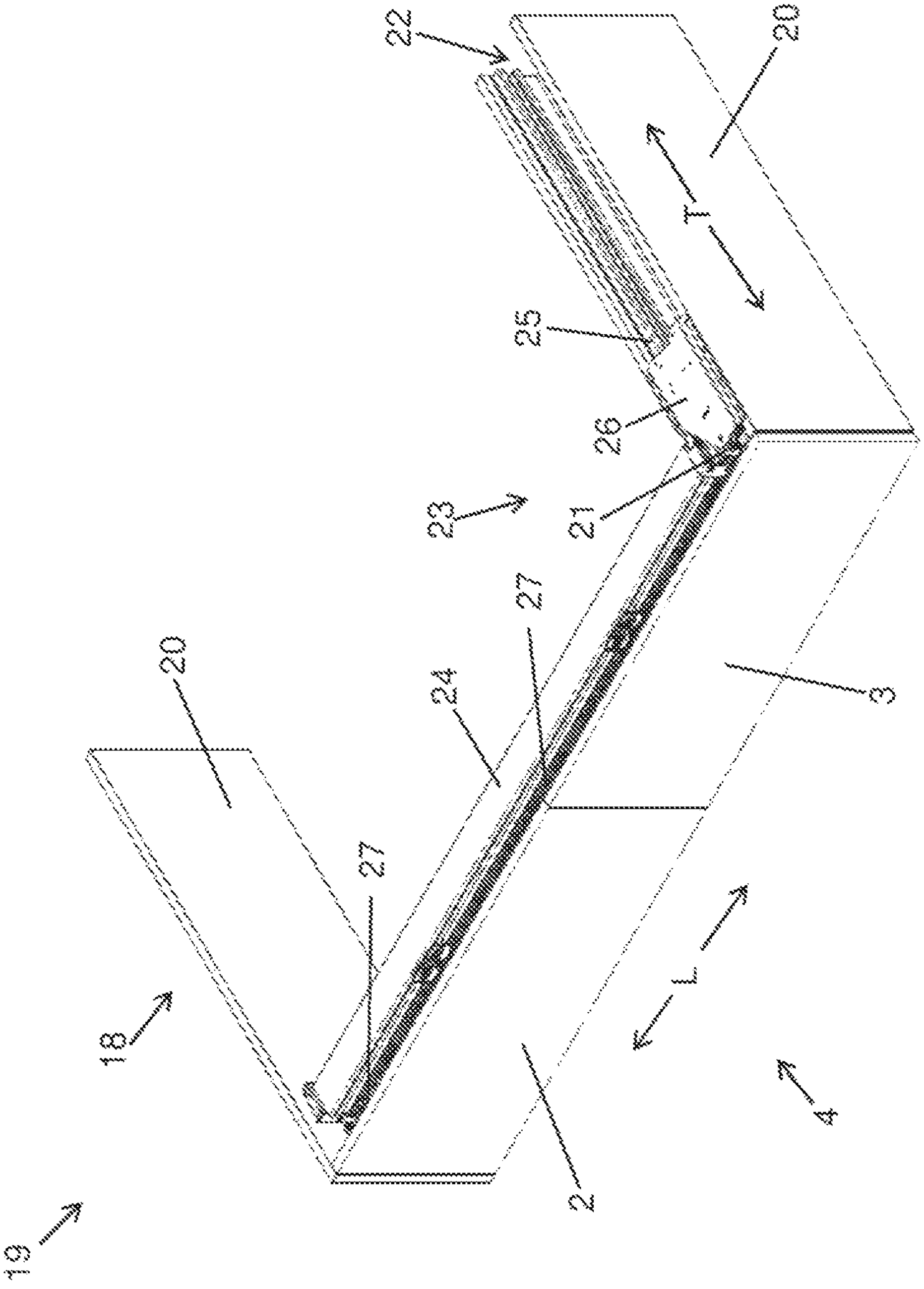

| | | | | |
|---|---|---|---|---|
| 7,478,892 | B2 * | 1/2009 | Punzel | E05C 9/043 312/351 |
| 9,068,386 | B2 * | 6/2015 | Ishii | E05D 15/58 |
| 11,274,482 | B2 | 3/2022 | Rupp et al. | |
| 11,512,513 | B2 | 11/2022 | Gasser | |
| 11,629,540 | B2 * | 4/2023 | Blum | E05D 7/0407 16/242 |
| 2015/0008811 | A1 | 1/2015 | Ishii et al. | |
| 2019/0284859 | A1 * | 9/2019 | Rupp | E05F 3/20 |
| 2020/0011105 | A1 | 1/2020 | Gasser | |
| 2021/0262269 | A1 * | 8/2021 | Goetz | E06B 3/50 |

FOREIGN PATENT DOCUMENTS

| | | |
|---|---|---|
| CN | 105986721 | 10/2016 |
| CN | 111108259 | 5/2020 |
| DE | 79 18 079 | 10/1979 |
| DE | 295 07 903 | 9/1995 |
| JP | 52-53138 | 10/1950 |
| JP | 7-71156 | 3/1995 |
| TW | 201901018 | 1/2019 |
| WO | 2011/058372 | 5/2011 |
| WO | 2012/059173 | 5/2012 |
| WO | 2013/114730 | 8/2013 |
| WO | 2020/097639 | 5/2020 |

* cited by examiner

FURNITURE FITTING AND ITEM OF FURNITURE HAVING SUCH A FURNITURE FITTING

BACKGROUND OF THE INVENTION

The present invention relates to a furniture fitting for supporting at least one door leaf, in particular at least two door leaves connected to each other in an articulated manner, against a fixed wall. The at least one door leaf is movable between an open position and a closed position in which the at least one door leaf can be arranged substantially transverse to the wall. The invention also relates to an item of furniture with such a furniture fitting.

Guide systems and items of furniture with guide systems, in which at least one door leaf—usually a folding door—can be fastened on a wall or a side wall of a furniture carcass, in which the door leaf is mounted pivotable between an open position and a closed position, are known from the state of the art (such as for example through WO 2020/097639 A1). This is generally undertaken by guide systems which can be arranged on one side of the door leaves (usually on a top side).

In such designs, this has the result that, in a closed position, the door leaf is supported on the guide system only on one side (usually on the top side), wherein no guiding or positional stability is provided on an underside—as it were on a free corner of the door leaf.

This has the disadvantage that, in the case of an application of force from the outside, this free corner has no positional stability in a transverse direction relative to the surface of the door leaf, whereby the door leaf can move into a closed position with respect to the furniture carcass in this area, which results in negative and disadvantageous loading of the guide system. The perception of an operator with respect to the guide system is also negatively affected.

It is therefore known from the state of the art to allow such door leaves to rest against a furniture carcass on the front side in a closed position, which, however, is not always possible or desired because of the esthetic appearance or structural conditions.

SUMMARY OF THE INVENTION

The object of the present invention is to provide a furniture fitting and an item of furniture with such a furniture fitting, in which the disadvantages of the state of the art mentioned at the beginning are improved and/or eliminated and/or a better positional stability of a door leaf can be provided in a closed position of the door leaf.

According to the invention, the furniture fitting has a first fitting part, preferably like a hinge cup, which is fastened on or in the wall and a second fitting part which is arranged on the at least one door leaf. In the closed position of the at least one door leaf, the two fitting parts can be connected to each other and, in the open position of the at least one door leaf, they can be separated from each other, and the two fitting parts in each case have at least one supporting element. The supporting elements of the two fitting parts can be brought into contact with each other by a movement, preferably a pivoting movement, of the at least one door leaf into the closed position such that, in the closed position of the at least one door leaf, the two fitting parts can be supported against each other at least in a direction transverse to the at least one door leaf.

The provision of two fitting bodies, which in each case have a supporting element, makes it possible for a door leaf in a closed position to be supported with respect to a wall with the aid of the supporting elements and the fitting parts, whereby an additional positional stability of the door leaf in the closed position is provided.

In the closed position of the at least one door leaf, the supporting elements form a positive-locking connection in the direction transverse to the at least one door leaf.

A "positive-locking connection" means, for example, that one supporting element engages in the other supporting element, wherein due to the geometric design, movement transverse to the at least one door leaf of the door leaf with respect to the wall (or more precisely: of the two supporting elements relative to each other) is prevented.

Preferably, at least one of the supporting elements of the fitting parts has a projection, preferably wherein the other of the fitting parts has at least one recess and the at least one projection engages in the recess in the closed position of the at least one door leaf.

The fitting part on which the at least one projection is arranged has at least one fastening interface, which can be brought into contact with the at least one door leaf at least in areas and wherein the at least one projection projects transversely from the at least one fastening interface at least in areas.

The term "fastening interface" means, for example, an area or a surface with which the fitting part can be brought into contact for fastening, wherein the fastening interface preferably describes the contact surface on which the fastening part rests against the at least one door leaf, against the wall or against a furniture carcass.

The at least one projection has a, preferably honeycombed, reinforcing structure and/or in a cross section is formed bent and/or finger-shaped at least in areas.

Through a, preferably honeycombed, reinforcing structure the material outlay of the projection can be minimized, viewed in cross section, wherein a stability of the projection, still with a small material outlay, is improved.

The at least one projection can be arranged, preferably integrally, on the at least one second fitting part. However, alternatively, the at least one second fitting part is formed in several pieces, wherein the at least one projection can be or is fastened on a main body of the at least one second fitting part.

The two fitting parts in each case have at least one fastening interface, which can be brought into contact with the at least one door leaf or the wall at least in areas. In the closed position of the at least one door leaf, the two fastening interfaces are arranged substantially transverse, preferably perpendicular, to each other.

Preferably, the first fitting part is formed like a hinge cup and has at least one flange for flat contact with the wall and/or at least one fastening structure on an outer wall of the hinge cup, via which the first fitting part can be fastened in a recess of the wall.

The fastening structure can, for example, have barbed projections, which get caught in a recess of the at least one door leaf or the wall.

For example, the fitting parts have a fastening device which can fasten the fitting part on the at least one door leaf or the wall, preferably using a screw connection.

Preferably, the at least one first fitting part and/or the at least one second fitting part is formed as a die-cast component, preferably made of a metallic material or a plastic. Thus, for example, one of the fitting parts is or can be produced by an injection-molding process or an aluminum die casting.

Protection is furthermore sought for an item of furniture with at least one door leaf which is mounted pivotable with respect to a furniture carcass, wherein the item of furniture has at least one furniture fitting according to the invention.

Preferably, the furniture carcass has at least one side wall, wherein the first fitting part is arranged on and/or in the side wall, and the second fitting part is arranged on the at least one door leaf.

The at least one door leaf is mounted in an articulated manner as a free door leaf on at least one further (second) door leaf, and the at least one further (second) door leaf is mounted pivotable on a carrier or the furniture carcass, wherein a folding door is formed by the at least two door leaves.

Preferably, the item of furniture has a shaft-like cavity, which extends in a depth direction of the item of furniture and in which, in an open position, the at least one door leaf is arranged, preferably completely, concealed.

For guiding the at least one door leaf relative to the furniture carcass, a guide system is provided, wherein the guide system comprises the following:

- at least one guide, which is formed to guide the at least one door leaf along a side wall of the furniture carcass,
- at least one carrier, which is mounted movable along the at least one guide and on which the at least one door leaf can be mounted pivotable between an open position and a closed position over a pivot path, wherein a second fitting part of the furniture fitting is arranged on a carrier and/or at an end of the at least one door leaf facing away from the guide.

At least two door leaves connected to each other in an articulated manner are provided, and the guide system has a further (second) guide transverse to the at least one (first) guide, on which the at least one carrier is movably mounted. The at least one (first) door leaf is arranged on the at least one carrier and at least one further (second) door leaf is arranged on the further (second) guide via at least one carriage, wherein the second fitting part of the furniture fitting is arranged on the at least one (first) door leaf.

DETAILED DESCRIPTION OF THE INVENTION

Figure 2A:
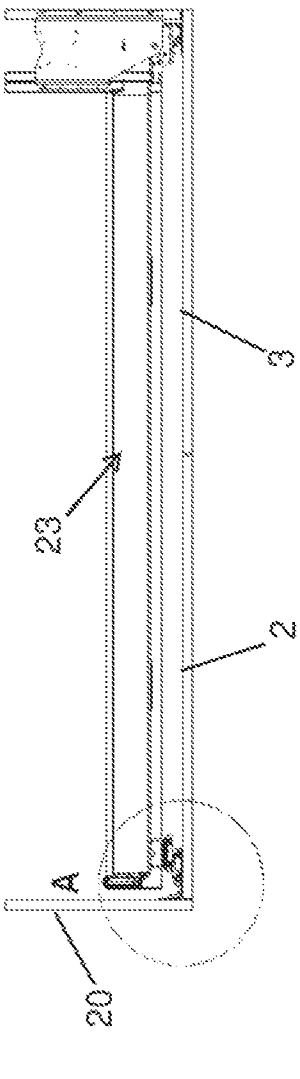
Figure 2C:
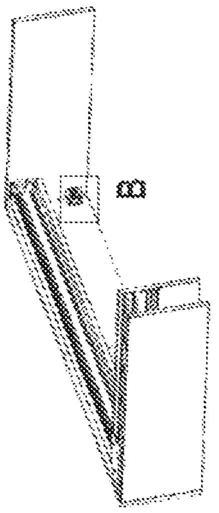
Figure 2D:
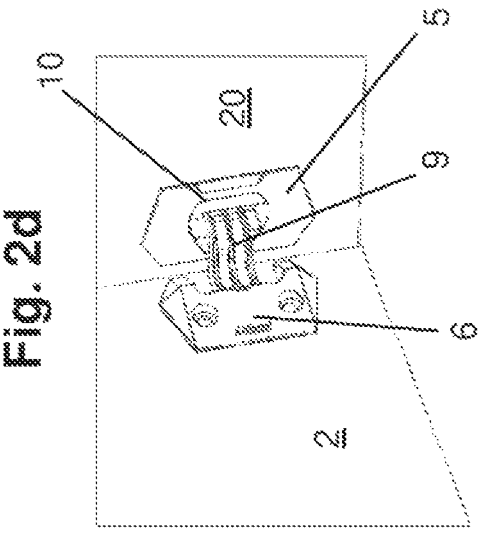
Figure 2B:
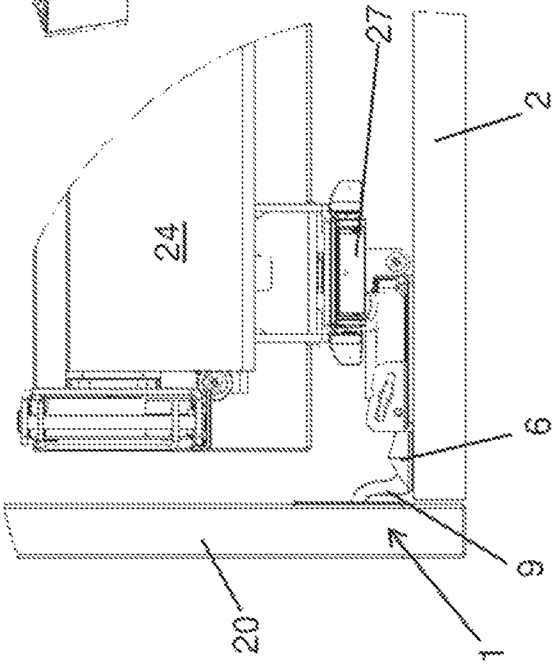
Figure 3A:
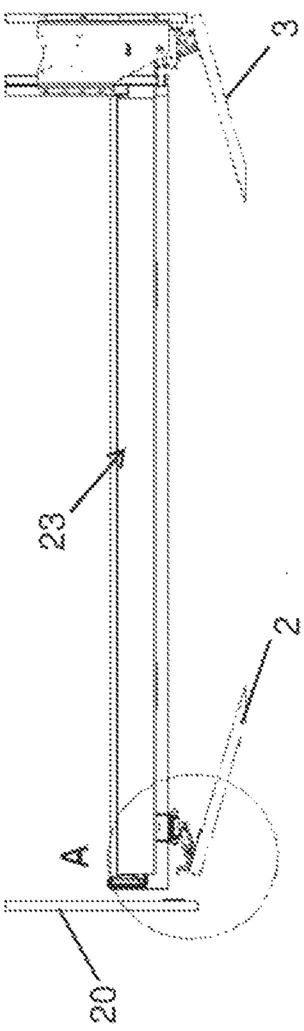
Figure 3C:
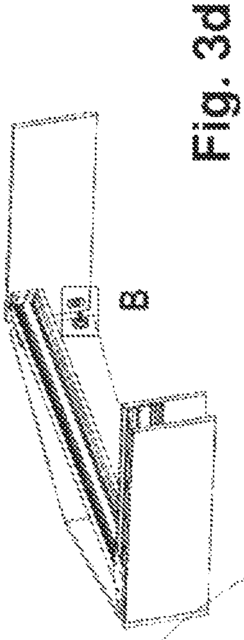
Figure 3D:
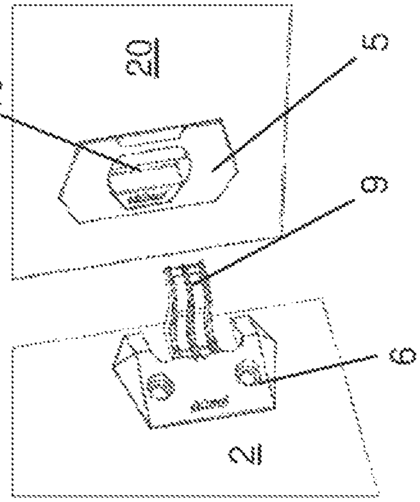
Figure 3B:
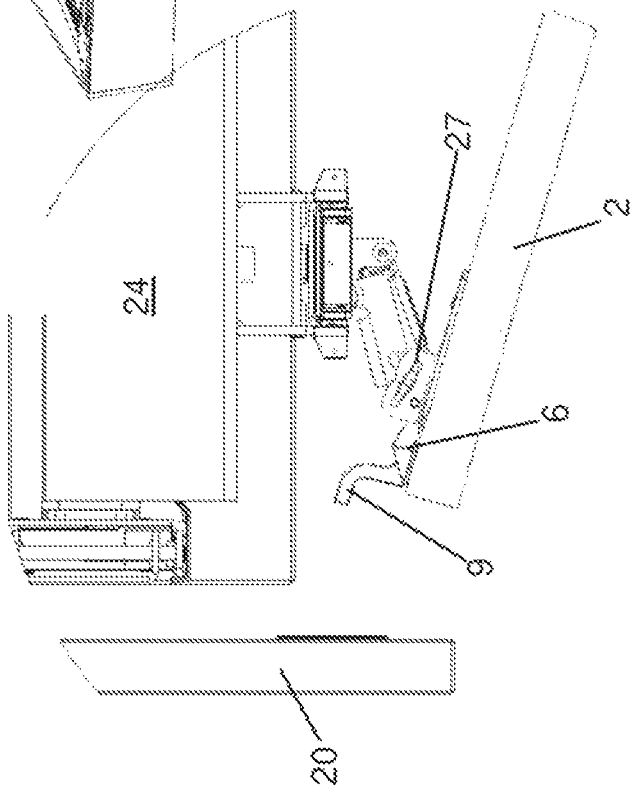
Figure 4C:
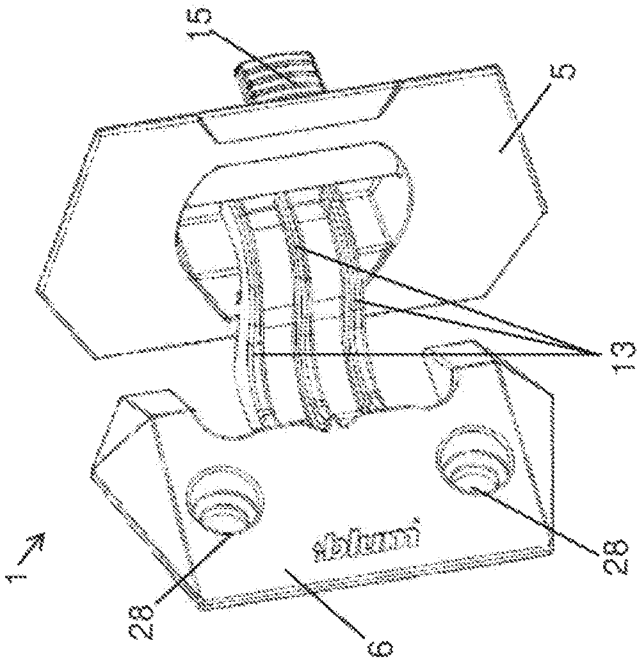
Figure 4A:
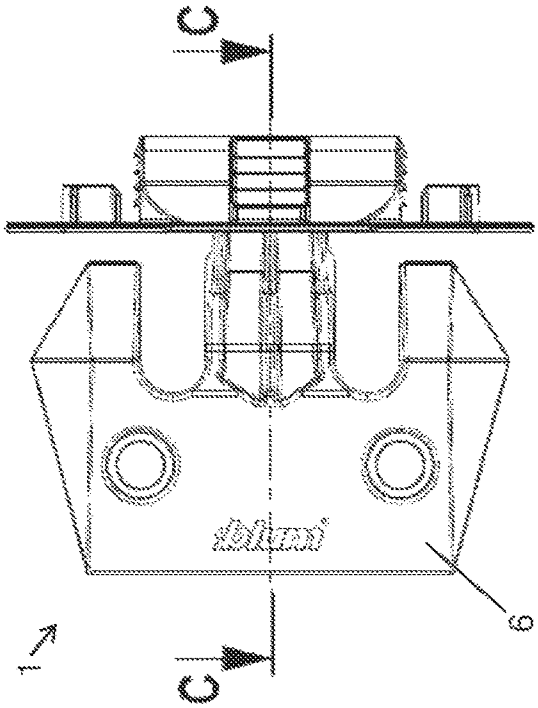
Figure 4B:
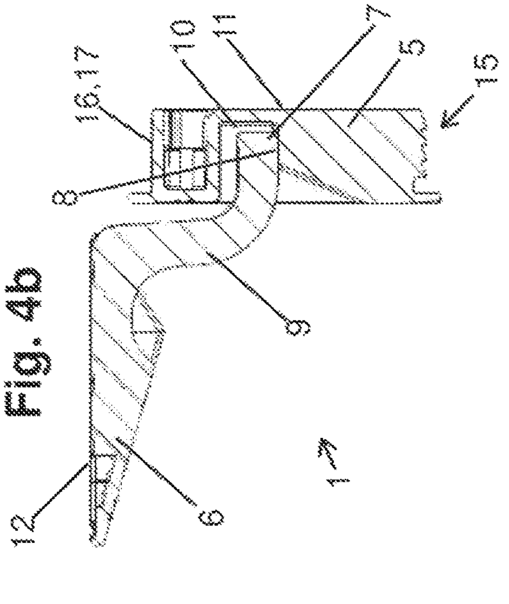
Figure 5A:
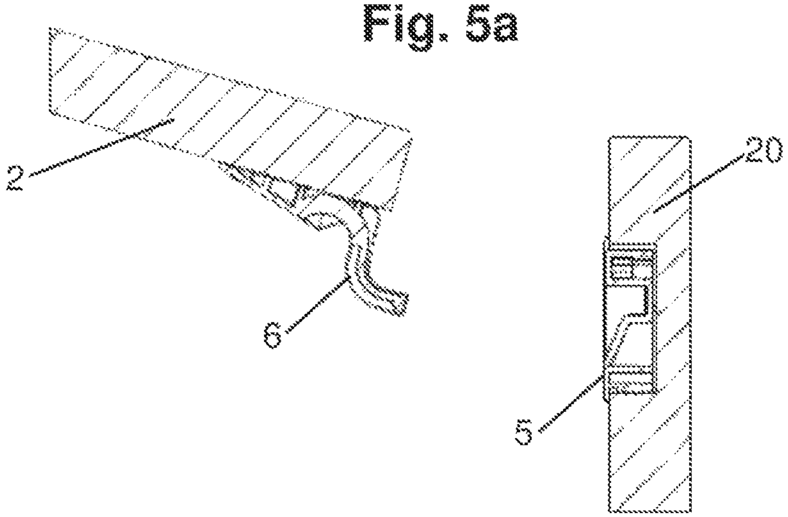
Figure 5B:
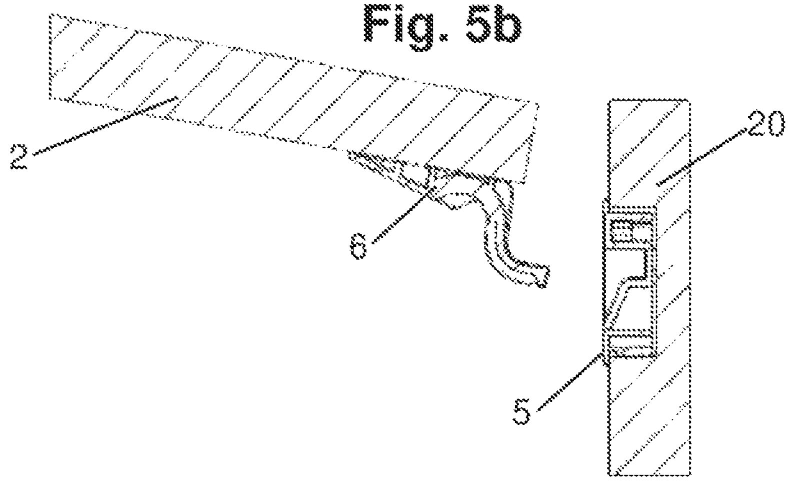
Figure 5C:
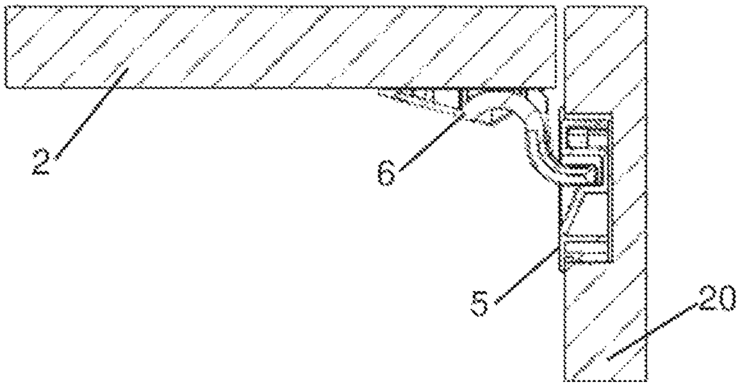
Figure 6A:
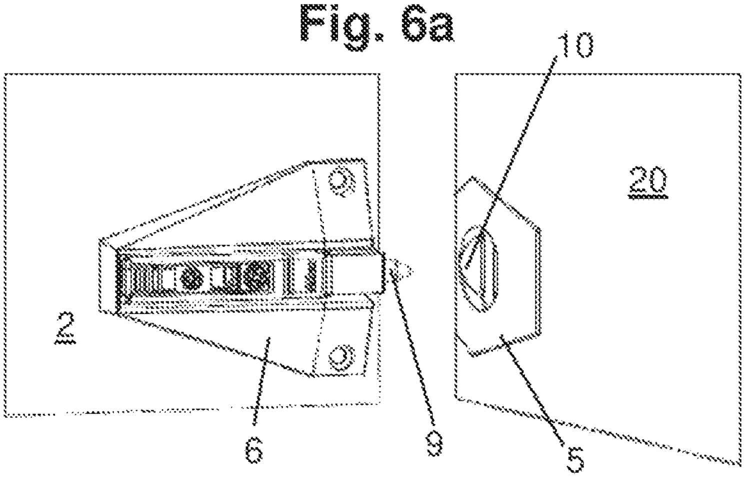
Figure 6B:
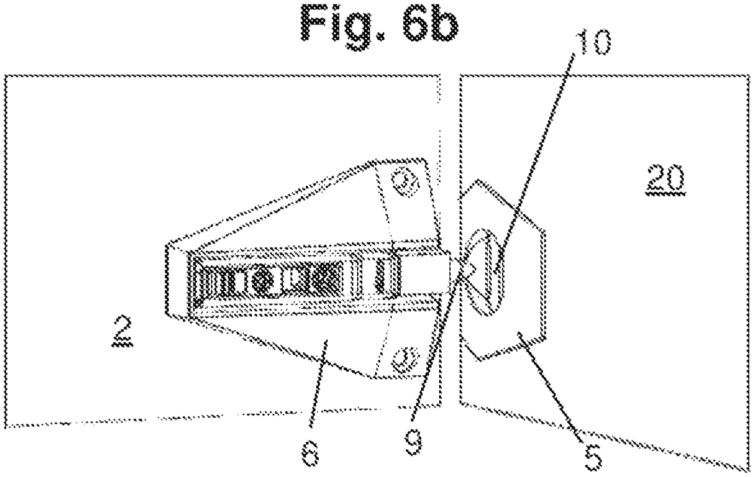
Figure 6C:
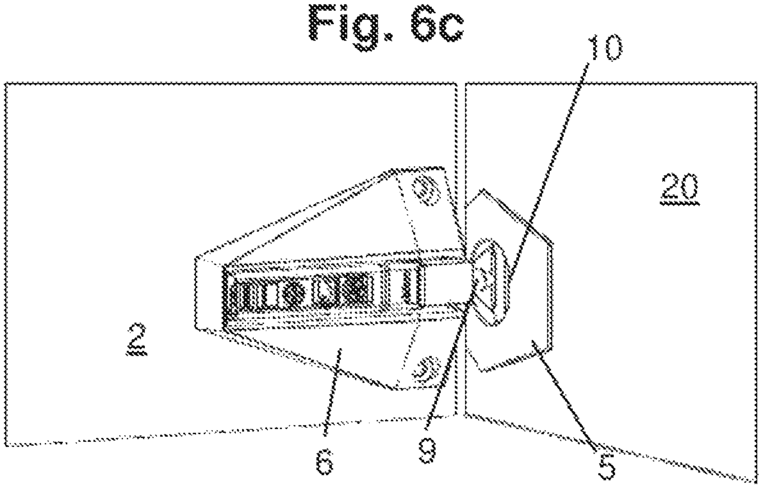
Figure 7:
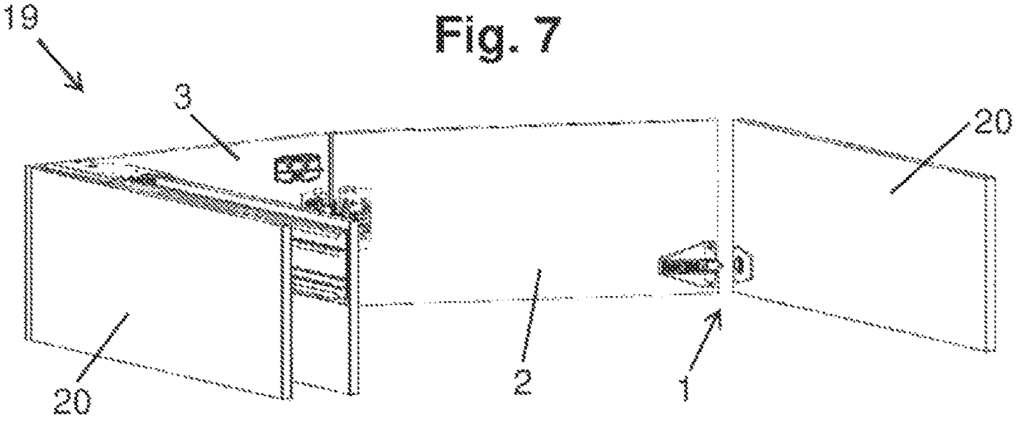
Figure 8:
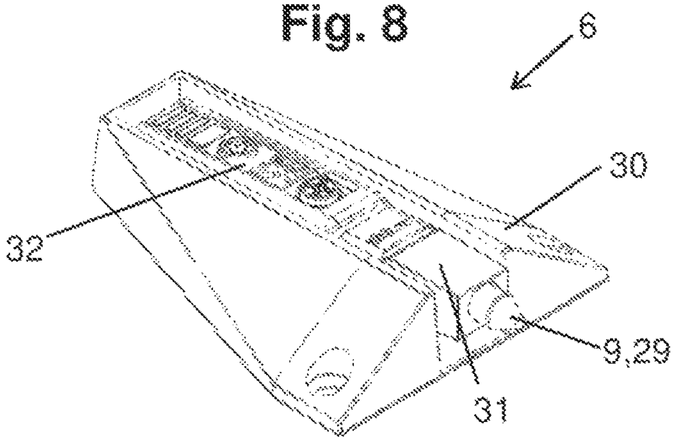
Figure 9:
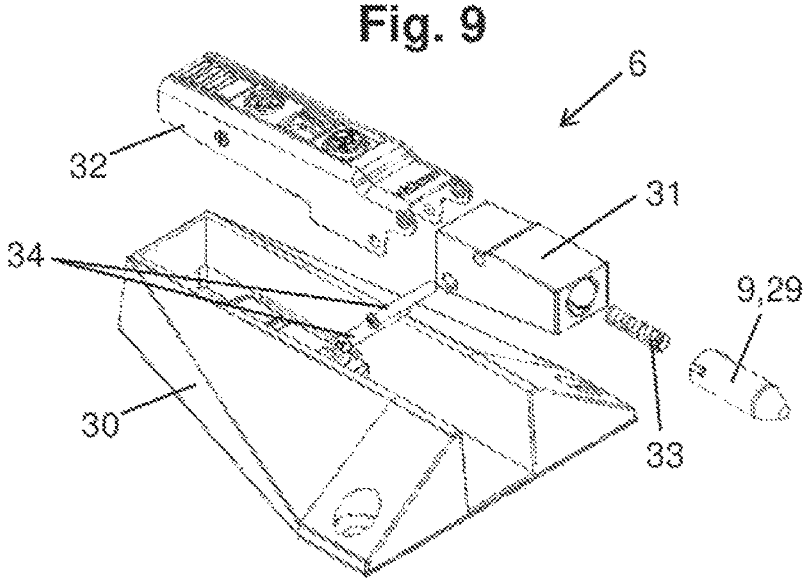

Further details and advantages of the present invention are explained by means of the following description of the invention, in which:

FIG. 1 is a perspective view of an item of furniture in a closed position,

FIGS. 2*a*-2*d* shows the embodiment known from FIG. 1 in a closed position in various views, FIGS. 3*a*-3*d* shows the embodiment known from FIG. 1 during an opening movement in various views, FIGS. 4*a*-4*c* an embodiment according to the invention of a furniture fitting in isolation in different views, FIGS. 5*a*-5*c* shows an example sequence of movements between the two fitting parts of a furniture fitting, FIGS. 6*a*-6*c* shows an example sequence of movements of a further embodiment of a furniture fitting, FIG. 7 is a perspective view of an item of furniture with a furniture fitting according to an embodiment from FIG. 6, FIG. 8 is a perspective view of a fitting part of the embodiment from FIG. 6, FIG. 9 is an exploded representation of the fitting part from FIG. 8, FIG. 10 *a,b* is a representation of the fitting part from FIGS. 8 and 9 in a first position, and FIG. 11 *a,b* is a representation of the fitting part from FIGS. 8 to 10 in a second position.

DETAILED DESCRIPTION OF THE INVENTION

FIG. 1 shows a perspective view of an item of furniture 19. The furniture carcass 18 of the item of furniture 1 is indicated by the two side walls 20 of the furniture carcass 18 in this representation. Moreover, the item of furniture 19 has a folding sliding door which is formed by the door leaves 2 and 3.

The door leaves 2 and 3 are pivotably connected to the furniture carcass 18 with the carrier 21, wherein they are movable between a closed position 4 (as is shown by FIG. 1) and an open position.

The door leaves 2 and 3 are aligned substantially coplanar relative to each other in the closed position 4 and substantially parallel to each other in an open position.

In an open position, the door leaves 2 and 3 can be pushed, parallel to each other, into a shaft-like cavity 22 of the furniture carcass 18 via the guide system 23.

The guide system 23 comprises a guide 24 with a longitudinal direction L, wherein the carriage 27 which can be coupled to the door leaf 2 is mounted such that it can travel along the guide 24.

In an installation position, the guide 24 is arranged substantially horizontal and parallel to a front edge of the furniture carcass 18.

Two or more hinges (not represented here for reasons of clarity) can be provided between the door leaf 2 and the door leaf 3, in order to mount the door leaves 2,3 pivotable relative to each other.

The second door leaf 3 can be mounted movable on a carrier 21 via two or more furniture hinges, wherein the carrier 21 can be pushed into the shaft-like cavity 22 in a depth direction T.

The carrier 21 is arranged on the guide 25 via the carriage 26, with the result that, via the carriage 26, the door leaves 2, 3, in a folded position (wherein the door leaves 2, 3 stand parallel to each other), can be guided into the shaft-like cavity 22 via the guide 25 and can remain there in an open position.

FIG. 2 shows the embodiment known from FIG. 1 in a closed position 4, wherein FIG. 2*a* represents a top view, FIG. 2*b* shows the detail view A from FIG. 2*a*, FIG. 2*c* represents a perspective view from behind, and FIG. 2*d* shows a detail view B from FIG. 2*c*.

It can be seen how the door leaves 2, 3 are aligned substantially coplanar relative to each other via the guide system 23 and the first door leaf 2 is attached to the side wall 20 of the furniture carcass 18 with the end face of the door leaf 2.

This is visible in FIG. 2*b* through the enlarged detail A from FIG. 2*a*, wherein the first door leaf 2 is connected to the guide 24 via the carriage 27 and, with its end face, is moved closer to the side wall 20, wherein there is still a small gap between side wall 20 and door leaf 2.

Moreover, it is visible that a furniture fitting 1 is provided, wherein a second fitting part 6 of the furniture fitting 1 is arranged on the door leaf 2.

This fitting part 6 has a finger-shaped projection 9, which engages in a recess 10 of the first fitting part 5 in the closed position 4. The first fitting part 5 of the fitting 1 is arranged in a recess (more precisely: a drilled hole in the side wall 20) due to a design like a hinge cup.

This is also clearly visible through the perspective representation of FIG. 2*c* or the enlarged detail view B in FIG. 2*d*.

It can be seen through these FIGS. 2*a* to 2*d* how, in the closed position 4 of the door leaf 2, the two fitting parts 5, 6 are supported against each other in a direction transverse to the at least one door leaf 2, whereby a stable position of the door leaf 2 in the closed position 4 is ensured and a relative movement between side wall 20 and door leaf 2 is prevented.

Due to the positive-locking connection of the first fitting part 5 to the second fitting part 6 (more precisely: due to the engagement of the projection 9 in the recess 10), a movement of the door leaf 2 in the direction transverse to the at least one door leaf 2 (or in a depth direction T) is prevented in the closed position 4.

FIG. 3 shows the embodiment of the previously shown figures during an opening movement of the door leaf 2, wherein, in turn, FIG. 3*a* represents a top view onto the item of furniture 1, FIG. 3*b* shows the detail view A from FIG. 3*a*, FIG. 3*c* represents a perspective view from behind, and FIG. 3*d* shows the enlarged detail view B from FIG. 3*c*.

It can thus be seen through FIGS. 3*a* to 3*d* how, due to a pivoting movement of the door leaf 2 and the door leaf 3, the door leaf 2 is lifted off the side wall 20 via the carriage 27 and the guide 24 of the guide system 23, wherein the fitting part 6, which is engaged in the closed position 4, is moved out of the fitting part 5 and spaced apart from it.

How this movement of the fitting parts 5, 6 relative to each other is performed via the pivoting movement of the door leaf 2 relative to the side wall 20 will be explained in more detail later by FIG. 5.

It can clearly be seen through FIGS. 3*a* to 3*d* and FIGS. 2*a* and 2*d* how the furniture fitting 1 is arranged on a side of the door leaf 2 facing away from the guide system 23 (in the lower area of the item of furniture 19).

FIGS. 4*a* to 4*c* show the fitting body in isolation, wherein

FIG. 4*a* represents a side view of the fitting body

FIG. 4*b* shows the top view from FIG. 4*a* in section C-C and

FIG. 4*c* shows a perspective side representation.

It can be seen (in particular in FIG. 4*b*) how the first fitting part 5 and the second fitting part 6 have fastening interfaces 11, 12, wherein the fastening interface 12 of the second fitting part 6 is aligned transverse (in fact perpendicular in this embodiment) to the fastening interface 11 of the first fitting part 5.

The first fitting part 5 is represented relative to the second fitting part 6 in a closed position 4 in FIGS. 4*a* to 4*c*.

In this closed position 4, the fitting parts 5, 6 stand close to each other via the first supporting element 7 and the second supporting element 8, wherein these supporting elements 7, 8 are implemented by contact surfaces in this embodiment.

The first supporting element 7 is formed by a lateral surface of the recess 10 of the first fitting part 5. The second supporting element 8 is formed by a surface of the projection 9 of the second fitting part 6, which projection 9 extends upwards substantially transversely from the fastening interface 12 of the second fitting part 6 and has a finger-shaped design.

This finger-shaped projection 9 is engaged in the recess 10 in the closed position 4 and has a reinforcing structure 13 for stabilization (which is visible through FIG. 4*c*).

The first fitting part 5 has a design like a hinge cup (which can possibly be regarded as a flange 14), wherein this hinge cup 17 can be inserted with its outside 16 into a corresponding recess in a wall (more precisely: a side wall 20 of the item of furniture 19) and rests there with its outer wall 16.

Due to the fastening structure 15 which has a barbed design, the fitting part 5 is held in the wall.

The second fitting part 6 has drilled holes 28, for fastening on a door leaf 2, via which a screw connection to the door leaf can be carried out.

The projection 9 of the second fitting part 6 is formed integral with the second fitting part 6.

The first fitting part 5 is also formed integral in its design like a hinge cup.

FIGS. 5*a* to 5*c* show a path of movement of how a second fitting part 6 of a furniture fitting 1, which is arranged on a door leaf 2, can be brought into contact via the rotating/pivoting movement of the guide system 23 (as is shown, for example, by FIGS. 1 to 3*c*) with a first fitting part 5 of the furniture fitting 1, which is arranged on a side wall 20 of an item of furniture 19, in a closed position 4.

FIGS. 6*a* to 6*c* show an example sequence of movements of a further embodiment of a furniture fitting 1.

This furniture fitting in turn has a first fitting part 5, which has a recess 10 and is fastened in a side wall 20 of a furniture carcass 18 or of an item of furniture 19.

The second fitting part 6, fastened on the door leaf 2, of the furniture fitting 1 of this embodiment has, unlike the preceding embodiments, a projection 9 which is movable relative to the fitting main body 30 of the second fitting part 6 (for a more detailed embodiment, reference is made here to FIGS. 8 to 11).

FIGS. 6*a* to 6*c* show an example sequence of movements of this embodiment of a furniture fitting 1, wherein (as in FIGS. 5*a* to 5*c*) a door leaf 2 moves closer to a side wall 20 of a furniture carcass 18 or of an item of furniture 19, until the door leaf 2 passes into a closed position.

FIG. 7 shows a perspective view of an item of furniture 19 with a furniture fitting 1 according to an embodiment of FIG. 6.

The furniture carcass 18 of the item of furniture 1 is indicated by the two side walls 20 of the furniture carcass 18 in this representation. Moreover, the item of furniture 19 has a folding sliding door which is formed by the door leaves 2 and 3.

The door leaves 2 and 3 are pivotably connected to the furniture carcass 18 by means of a carrier 21 (as in the embodiment of FIG. 1), wherein they are movable between a closed position 4 and an open position.

In the closed position 4, the door leaves 2 and 3 are aligned substantially coplanar relative to each other and are supported against the side wall 20 via the furniture fitting 1.

During the transfer of the door leaves 2 and 3, more precisely of the door leaf 2, the projection 9 of the furniture fitting 1 is positioned in the recess 10, whereby, via the projection 9, the door leaf 2 is supported against the side wall 20 via the recess 10.

FIG. 8 shows a perspective view of the second fitting part 6 of the known embodiment variant from FIGS. 6 and 7. FIG. 9 shows an exploded representation of this second fitting part 6 from FIG. 8.

It can be seen here that this further embodiment of the furniture fitting 1 has a second fitting part 6, in which the projection 9 (more precisely the projection 9 formed as a peg 29) is mounted movable linearly with respect to a fitting main body 30 along its center axis.

This mobility of the projection 9, more precisely of the peg 29, is implemented by means of the spring element 33.

The peg 29, which forms the projection 9, is arranged in a corresponding drilled hole of the receiver element 31 and pretensioned with respect to the receiver element 31 via the spring element 33.

The receiver element 31 is connected to the connecting body 32 via pins 34, wherein the connecting body 32 can in turn be detachably connected to the fitting main body 30.

The fitting main body 30 can be fastened on a door leaf 2, 3 or a side wall 20, for example via a screw connection.

The receiver element 31 can be fitted on the fitting main body 30 via the connecting body 32, in the fitted state can be pivoted about an axis preferably running horizontally and can be locked on the fitting main body 30.

This can also be seen in more detail through the sections represented in FIGS. 10*a*, 10*b* and FIGS. 11*a*, 11*b*.

The peg 29, which forms the projection 9, is anchored by way of its geometric design in the undercut of the drilled hole in the receiver element 31 (concerning this compare FIGS. 10*b* and 11*b*), wherein the peg 29 is pretensioned with respect to the receiver element 31 by means of the spring element 33.

If a compressive force is now exerted on the peg 29, it can perform a relative movement with respect to the receiver element 31 (and thus with respect to the fitting main body 30) because the spring element 33 is tensioned.

Once the compressive force on the peg 29 has been released, it is in turn pushed back into the original state via the pretensioned spring element 33.

Figure 10A:
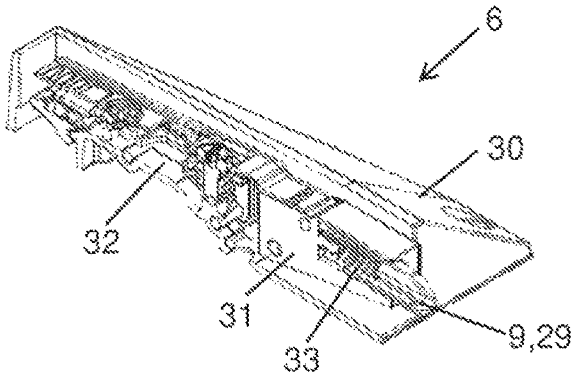
Figure 10B:
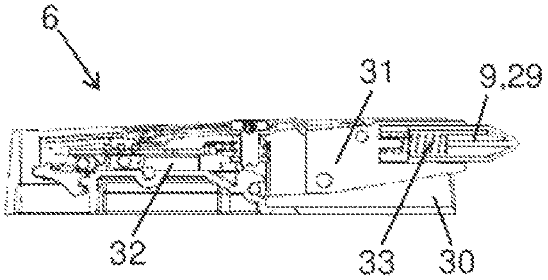

Thus, FIGS. 10*a*, 10*b* show an unloaded state of the peg 29.

Figure 11A:
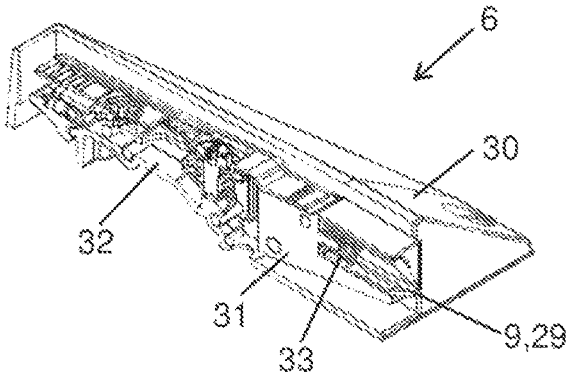
Figure 11B:
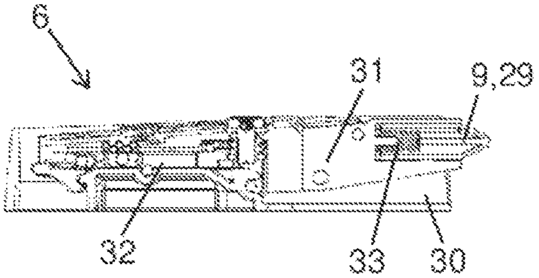

In FIGS. 11*a*, 11*b*, on the other hand, a compressive force is exerted on the peg 29 and it is thus displaced into a pulled-back position in the receiver element 31.

This represents the advantage that a projection 9, in terms of its longitudinal extent, need not be positioned exactly with respect to a recess 10 or a door leaf 2 need not be optimally arranged with respect to a side wall 20, wherein small deviations over the longitudinal displacement of the peg 29 can be compensated for.

LIST OF REFERENCE NUMBERS

1 furniture fitting
2 door leaf
3 door leaf
4 closed position
5 first fitting part
6 second fitting part
7 first supporting element
8 second supporting element
9 projection
10 recess
11 fastening interface
12 fastening interface
13 reinforcing structure
14 flange
15 fastening structure
16 outer wall
17 hinge cup
18 furniture carcass
19 item of furniture
20 side wall
21 carrier
22 shaft-like cavity
23 guide system
24 guide
25 guide
26 carriage
27 carriage
28 drilled hole
29 peg
30 fitting main body
31 receiver element
32 connecting body
33 spring element
34 pin
T depth direction
L longitudinal direction

The invention claimed is:

1. A furniture fitting for supporting at least one door leaf against a fixed wall, wherein the at least one door leaf is movable between an open position and a closed position in which the at least one door leaf is arranged substantially transverse to the wall, the furniture fitting comprising:

a first fitting part configured to be fastened on or in the wall; and a second fitting part configured to be arranged on the at least one door leaf, wherein the first and second fitting parts are configured to be connected to each other in the closed position of the at least one door leaf, and are configured to be separated from each other in the open position of the at least one door leaf, wherein the first and second fitting parts each have a respective supporting element, wherein the supporting elements of the first and second fitting parts are configured to be brought into contact with each other by a movement of the at least one door leaf into the closed position such that, in the closed position of the at least one door leaf, the two fitting parts are supported against each other at least in a direction transverse to the at least one door leaf, wherein the supporting element of one of the first and second fitting parts has at least one projection, and the other of the first and second fitting parts has at least one recess, and the at least one projection is configured to be engaged in the at least one recess in the closed position of the at least one door leaf, and wherein the at least one projection is movable relative to a fitting main body of the one of the first and second fitting parts.

2. The furniture fitting according to claim 1, wherein, in the closed position of the at least one door leaf, the supporting elements of the first and second fitting parts form a positive-locking connection in the direction transverse to the at least one door leaf.

3. The furniture fitting according to claim 1, wherein the one of the first and second fitting parts has at least one fastening interface which is configured to be brought into at least partial contact with the at least one door leaf, and wherein the at least one projection at least partially projects transversely from the at least one fastening interface.

4. The furniture fitting according to claim 1, wherein the first and second fitting parts each have a respective fastening interface which is configured to be brought into at least partial contact with the at least one door leaf or the wall and wherein the fastening interfaces of the first and second fitting parts are configured to be arranged substantially transverse to each other in the closed position of the at least one door leaf.

5. The furniture fitting according to claim 1, wherein the first fitting part is formed as a hinge cup, and wherein the first fitting part has at least one flange for flat contact with the wall, or at least one fastening structure on an outer wall of the hinge cup via which the first fitting part can be fastened in a recess of the wall.

6. The furniture fitting according to claim 1, wherein the first fitting part or the second fitting part is formed as a die-cast component.

7. The furniture fitting according to claim 6, wherein the die-cast component is made of a metallic material or a plastic.

8. An item of furniture with a first door leaf which is mounted pivotably with respect to a furniture carcass, wherein the item of furniture comprises the furniture fitting according to claim 1.

9. The item of furniture according to claim 8, wherein the furniture carcass has at least one side wall, and wherein the first fitting part is arranged on or in the at least one side wall and the second fitting part is arranged on the first door leaf.

10. The item of furniture according to claim 8, wherein the first door leaf is mounted in an articulated manner as a free door leaf on a second door leaf, wherein the second door leaf is mounted pivotably on a carrier or the furniture carcass, and wherein a folding door is formed by the first and second door leaves.

11. The item of furniture according to claim 8, wherein the item of furniture has an elongated cavity, which extends in a depth direction of the item of furniture, and wherein the first door leaf is configured to be arranged in the elongated cavity in an open position of the first door leaf.

12. The item of furniture according to claim 11, wherein first door leaf is configured to be completely arranged in the elongated cavity so as to be concealed.

13. The item of furniture according to claim 8, further comprising a guide system for guiding the first door leaf relative to the furniture carcass, the guide system comprising:

a first guide, which is formed to guide the first door leaf along a side wall of the furniture carcass; and at least one carrier, which is mounted movably along the first guide, wherein the first door leaf is configured to be mounted pivotably on the at least one carrier between an open position and a closed position over a pivot path, wherein the second fitting part of the furniture fitting is arranged on the at least one carrier or at an end of the first door leaf facing away from the first guide.

14. The item of furniture according to claim 13, further comprising a second door leaf, the first and second door leaves being connected to each other in an articulated manner, wherein the guide system has a second guide transverse to the first guide, the at least one carrier being movably mounted on the second guide, wherein the first door leaf is arranged on the at least one carrier and the second door leaf is arranged on the second guide via at least one carriage, and wherein the second fitting part of the furniture fitting is arranged on the first door leaf.

15. The furniture fitting according to claim 1, wherein:

the at least one door leaf comprises at least two door leaves connected to each other in an articulated manner;

the first fitting part comprises a hinge cup; or wherein the supporting elements of the first and second fitting parts are configured to be brought into contact with each other by a pivoting movement.

* * * * *